US006449655B1

(12) United States Patent
Hann et al.

(10) Patent No.: US 6,449,655 B1
(45) Date of Patent: Sep. 10, 2002

(54) METHOD AND APPARATUS FOR COMMUNICATION BETWEEN NETWORK DEVICES OPERATING AT DIFFERENT FREQUENCIES

(75) Inventors: William P. Hann, Round Rock; Gregory L. Singleton, Austin; Richard L. House, Round Rock, all of TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,451

(22) Filed: Jan. 8, 1999

(51) Int. Cl.[7] .............................................. G06F 15/16

(52) U.S. Cl. ...................... 709/233; 709/232; 709/248; 370/358; 370/391

(58) Field of Search ................................ 709/233, 248, 709/232; 370/358, 391

(56) References Cited

U.S. PATENT DOCUMENTS

| 3,980,993 | A | * | 9/1976 | Bredart et al. ............... 713/501 |
| 4,771,425 | A | | 9/1988 | Baran et al. ................... 370/85 |
| 4,819,228 | A | | 4/1989 | Baran et al. ................... 370/85 |
| 4,903,261 | A | | 2/1990 | Baran et al. ............... 370/94.2 |
| 4,975,906 | A | | 12/1990 | Takiyasu et al. .......... 370/85.13 |
| 4,985,889 | A | | 1/1991 | Frankish et al. ........... 370/94.1 |
| 5,020,058 | A | | 5/1991 | Holden et al. ............... 370/109 |
| 5,059,925 | A | | 10/1991 | Weisbloom .................. 331/1 A |
| 5,072,449 | A | | 12/1991 | Enns et al. ................. 371/37.1 |
| 5,088,032 | A | | 2/1992 | Bosack ........................ 395/200 |
| 5,115,431 | A | | 5/1992 | Williams et al. ........... 370/94.1 |
| 5,119,403 | A | | 6/1992 | Krishnan ...................... 375/39 |
| 5,128,945 | A | | 7/1992 | Enns et al. ................. 371/37.1 |
| 5,224,099 | A | | 6/1993 | Corbalis et al. ........... 370/94.2 |
| 5,255,291 | A | | 10/1993 | Holden et al. ............... 375/111 |
| 5,274,631 | A | | 12/1993 | Bhardwaj ..................... 370/60 |
| 5,274,635 | A | | 12/1993 | Rahman et al. ............ 370/60.1 |
| 5,274,643 | A | | 12/1993 | Fisk ........................... 370/94.1 |
| 5,313,454 | A | | 5/1994 | Bustini et al. ................. 370/13 |
| 5,317,562 | A | | 5/1994 | Nardin et al. ................. 370/16 |
| 5,359,592 | A | | 10/1994 | Corbalis et al. ............... 370/17 |
| 5,394,394 | A | | 2/1995 | Crowther et al. ............. 370/60 |
| 5,422,880 | A | | 6/1995 | Heitkamp et al. ............ 370/60 |
| 5,430,715 | A | | 7/1995 | Corbalis et al. ............... 370/54 |

(List continued on next page.)

FOREIGN PATENT DOCUMENTS

| EP | 0677 941 A2 | 10/1995 |
| WO | WO 95/20282 | 7/1995 |
| WO | WO 96/04729 | 2/1996 |

OTHER PUBLICATIONS

"Utopia Specification Level 1, Version 2.01," (af–phy–0017.000), *The ATM Forum Committee,* Mar. 21, 1994, 19 pages.

Anthony Alles, "ATM Internetworking," *Cisco Systems, Inc.,* May 1995, 59 pages.

"Utopia Level 2, Version 1.0," (af–phy–0039.000), *The ATM Forum Committee,* Jun. 1995, 69 pages.

*Primary Examiner*—Saleh Najjar
(74) *Attorney, Agent, or Firm*—Baker Botts L.L.P.

(57) ABSTRACT

A method for communicating information in a communication network having a first high speed device, a second high speed device, and a low speed device includes transferring data between the first high speed device and the second high speed device at a first rate and transferring data between the first high speed device and the low speed device at a second rate different from the first rate. Transferring data between the first high speed device and the low speed device at a second rate different from the first rate includes receiving at the first rate, at a buffer system, data from the first high speed device and transmitting at the second rate, to the low speed device, data from the buffer system. Transferring data between the first high speed device and the low speed device at a second rate different from the first rate also includes receiving at the second rate, at the buffer system, data from the low speed device and transmitting at the first rate, to the high speed device, data from the buffer system.

17 Claims, 4 Drawing Sheets

U.S. PATENT DOCUMENTS

| | | | |
|---|---|---|---|
| 5,434,863 A | 7/1995 | Onishi et al. | 370/85.13 |
| 5,452,306 A | 9/1995 | Turudic et al. | 370/110.1 |
| 5,461,624 A | 10/1995 | Mazzola | 370/85.13 |
| 5,473,599 A | 12/1995 | Li et al. | 370/16 |
| 5,473,607 A | 12/1995 | Hausman et al. | 370/85.13 |
| 5,485,456 A * | 1/1996 | Shlayer et al. | 370/60 |
| 5,509,006 A | 4/1996 | Wilford et al. | 370/60 |
| 5,517,488 A | 5/1996 | Miyazaki et al. | 370/16 |
| 5,519,704 A | 5/1996 | Farinacci et al. | 370/85.13 |
| 5,555,244 A | 9/1996 | Gupta et al. | 370/60.1 |
| 5,561,663 A | 10/1996 | Klausmeier | 370/17 |
| 5,561,669 A | 10/1996 | Lenney et al. | 370/60.1 |
| 5,570,360 A | 10/1996 | Klausmeier et al. | 370/60 |
| 5,583,862 A | 12/1996 | Callon | 370/397 |
| 5,598,581 A | 1/1997 | Daines et al. | 395/872 |
| 5,604,741 A | 2/1997 | Samueli et al. | 370/402 |
| 5,612,957 A | 3/1997 | Gregerson et al. | 370/401 |
| 5,617,417 A | 4/1997 | Sathe et al. | 370/394 |
| 5,617,421 A | 4/1997 | Chin et al. | 370/402 |
| 5,666,353 A | 9/1997 | Klausmeier et al. | 370/230 |
| 5,673,265 A | 9/1997 | Gupta et al. | 370/432 |
| 5,691,997 A | 11/1997 | Lackey, Jr. | 371/53 |
| 5,729,546 A | 3/1998 | Gupta et al. | 370/434 |
| 5,732,079 A | 3/1998 | Castrigno | 370/362 |
| 5,737,526 A | 4/1998 | Periasamy et al. | 395/200.06 |
| 5,737,635 A | 4/1998 | Daines et al. | 395/872 |
| 5,740,171 A | 4/1998 | Mazzola et al. | 370/392 |
| 5,740,176 A | 4/1998 | Gupta et al. | 370/440 |
| 5,742,602 A * | 4/1998 | Bennett | 370/401 |
| 5,742,604 A | 4/1998 | Edsall et al. | 370/401 |
| 5,742,649 A | 4/1998 | Muntz et al. | 375/371 |
| 5,764,636 A | 6/1998 | Edsall | 370/401 |
| 5,764,641 A | 6/1998 | Lin | 370/412 |
| 5,765,032 A | 6/1998 | Valizadeh | 395/200.65 |
| 5,787,070 A | 7/1998 | Gupta et al. | 370/217 |
| 5,787,255 A | 7/1998 | Parlan et al. | 395/200.63 |
| 5,793,763 A | 8/1998 | Mayes et al. | 370/389 |
| 5,793,978 A | 8/1998 | Fowler | 395/200.56 |
| 5,796,732 A | 8/1998 | Mazzola et al. | 370/362 |
| 5,802,042 A | 9/1998 | Natarajan et al. | 370/255 |
| 5,805,595 A | 9/1998 | Sharper et al. | 370/442 |
| 5,812,618 A | 9/1998 | Muntz et al. | 375/372 |
| 5,822,383 A | 10/1998 | Muntz et al. | 375/362 |
| 5,835,036 A | 11/1998 | Takefman | 341/95 |
| 5,835,481 A | 11/1998 | Akyol et al. | 370/216 |
| 5,835,494 A | 11/1998 | Hughes et al. | 370/397 |
| 5,835,725 A | 11/1998 | Chiang et al. | 395/200.58 |
| 5,838,915 A | 11/1998 | Klausmeier et al. | 395/200.45 |
| 5,838,994 A | 11/1998 | Valizadeh | 395/876 |
| 5,859,550 A | 1/1999 | Brandt | 327/156 |
| 5,864,542 A | 1/1999 | Gupta et al. | 370/257 |
| 5,867,666 A | 2/1999 | Harvey | 395/200.68 |
| 5,905,766 A * | 5/1999 | Nguyen | 375/354 |
| 5,937,167 A * | 8/1999 | Arimilli et al. | 709/223 |
| 5,959,973 A * | 9/1999 | Meurisse et al. | 370/232 |
| 6,021,116 A * | 2/2000 | Chiussi et al. | 370/236 |
| 6,023,725 A * | 2/2000 | Ozawa et al. | 709/219 |
| 6,038,217 A * | 3/2000 | Lyles | 370/233 |
| 6,047,328 A * | 4/2000 | Charny et al. | 709/233 |
| 6,147,997 A * | 11/2000 | Holden et al. | 370/395 |
| 6,229,805 B1 * | 5/2001 | Linton | 370/358 |

* cited by examiner

POLL PHY BASED ON SPACE IN FIFO

WRITE CELL TO FIFO FROM PHY; CONTINUE POLLING

PHY POLLED FOR THE FIRST TIME

PHY POLLED FOR THE SECOND TIME

METHOD AND APPARATUS FOR COMMUNICATION BETWEEN NETWORK DEVICES OPERATING AT DIFFERENT FREQUENCIES

TECHNICAL FIELD OF THE INVENTION

This invention relates generally to computer and telecommunications networks and more particularly to a method and apparatus for communication between network devices operating at different frequencies.

BACKGROUND OF THE INVENTION

Manufacturers of network equipment encounter increasingly complex data transfer design issues as networks and network devices have evolved into sophisticated systems. An increasing number of network systems now utilize a synchronous transfer mode (ATM) technology, which in many applications provides a more effective way to transfer data across a network.

ATM is a layered architecture allowing multiple services like voice, data, and video to be mixed over the network. Three lower level layers have been defined to implement the features of ATM. An Adaptation Layer assures the appropriate service characteristics and divides all types of data into a 48 byte payload that will make up an ATM cell. An ATM Layer takes the data to be sent and adds a 5 byte header information that assures the cell is sent to the right connection. A Physical Layer defines the electrical characteristics in network interfaces. This layer performs necessary operations to effect transmission of data along the transmission media. However, ATM is not tied to a specific type of physical transport.

A number of protocols exist for transmission of information between the ATM Layer and the Physical layer. One such protocol is the Universal Tests and Operation Physical Interface for ATM (UTOPIA) data path interface. UTOPIA defines the interface between the Physical Layer and upper layer modules such as the ATM Layer. The definition allows a common physical interface in ATM sub-systems across a wide range of speeds and media types. UTOPIA controllers are physical devices that implement the UTOPIA protocol for transmitting information between the physical layer and the ATM layer. A UTOPIA I controller is capable of controlling a single slave device, and a UTOPIA II controller is capable of controlling a plurality of slave devices.

One problem with traditional networks utilizing a UTOPIA II controller, or interface, is that many slave controllers run at a maximum rate that is less than the rate at an associated master controller operate. This problem is conventionally added by slowing the master controller to the rate of the lowest slave controller. Such a procedure however, slows down the overall performance of the circuit required to convert the ATM layer side UTOPIA interface to a physical layer device at a lower frequency.

SUMMARY OF THE INVENTION

Accordingly, a need has arisen for a method and apparatus for communication between network devices operating at different frequencies. The present invention provides a method apparatus for communication between network devices operating at different frequencies that addresses shortcomings of prior systems and methods.

According to one embodiment of the invention, a method for communicating information in a communication network having a first high speed device, a second high speed device, and a low speed device includes transferring data between the first high speed device and the second high speed device at a first rate and transferring data between the first high speed device and the low speed device at a second rate different from the first rate. Transferring data between the first high speed device and the low speed device at a second rate different from the first rate includes receiving at the first rate, at a buffer system, data from the first high speed device and transmitting at the second rate, to the low speed device, data from the buffer system. Transferring data between the first high speed device and the low speed device at a second rate different from the first rate also includes receiving at the second rate, at the buffer system, data from the low speed device and transmitting at the first rate, to the high speed device, data from the buffer system.

According to another embodiment of the invention, an apparatus for facilitating communication in a network between a first network device operable to receive and transmit data at a first frequency and a second network device operable to receive and transmit data at a second frequency includes a buffer system and a state machine system. The state machine stores in the buffer system, at the first frequency, data from the first network device, and in response, retrieves data from the buffer system, at the second frequency, for providing to the second network device. The state machine system also stores in the buffer system, at the second frequency, data from the second network device, and in response, retrieves data from the buffer system, at the first frequency, for providing to the first network device.

Embodiments of the invention provide numerous technical advantages. For example, the invention allows devices operating at different frequencies to communicate with each other in the same network. Such communication can be facilitated even with the use of "off-the-shelf" products that are not easily modified because, according to one embodiment of the invention, a frequency conversion device is provided that does not require modification of existing network devices. Thus, the invention facilitates improved performance of overall bus speed by preventing slower peripherals from slowing down faster devices on the same bus.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 8 of the drawings, like numerals being used for like and corresponding parts of the various drawings.

Figure 1:
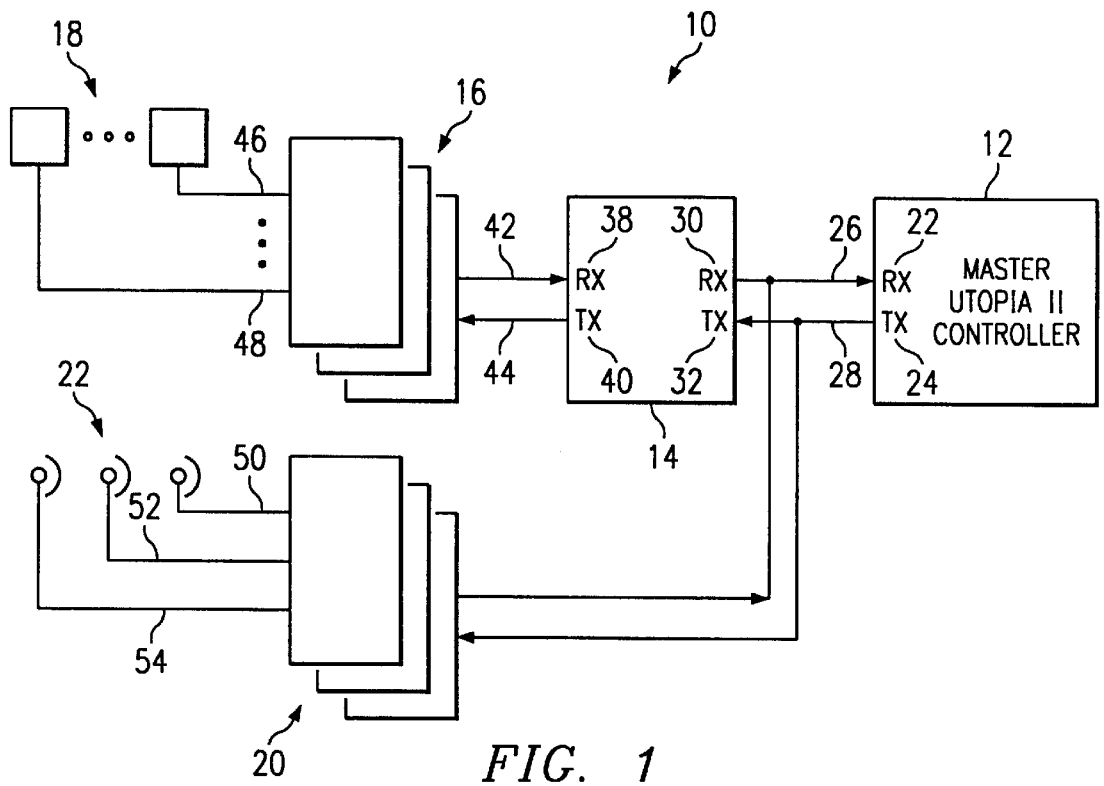
FIG. 1 is a block diagram of a network implementing a network frequency converter according to the teachings of the present invention.

FIG. 1 is a block diagram of a network 10 implementing a network frequency converter 14 incorporating the teachings of the present invention. Network 10 is preferably a computer or telecommunications network operating according to the Asynchronous Transfer Mode (ATM) protocol. Network 10 preferably includes a Master UTOPIA II Controller 12 (hereinafter "master controller 12"). UTOPIA (Universal Test and Operations Physical Interface) is a standard ATM interface that provides a protocol for various configurations of data cells that are available for transfer across the network. It should be understood, however, that the present invention may be used with other switching protocols.

Network 10 also includes low-speed slave controllers 16 and high-speed slave controllers 20, which acts in a "slave" fashion under the control of master controller 12. Low-speed slave controllers 16 may be coupled to and control various low-speed peripherals 18 through the use of data links 46 and 48. Low-speed peripherals 18 may include modems, and the like. High-speed slave controllers 20 may be coupled to various high-speed peripherals 22 through the use of data links 50, 52, and 54. High speed peripherals 22 may include DS3 ports, and the like.

Data traveling between the network controllers, such as master controller 12 and slave controllers 16 and 20, is preferably configured as a plurality of data values in accordance with the UTOPIA protocol. The data values are typically comprised of 53 bytes of data. The data values include header and data fields that may be verified to ensure data integrity. These 53 bytes constitute a "cell." A UTOPIA I interface is used to transfer data between a master controller and a single slave controller. A UTOPIA II interface permits a master controller to transfer data to a plurality of slave controllers, such as illustrated in FIG. 1. Additional operational details may be found in UTOPIA interface specifications entitled, The ATM Forum Technical Committee UTOPIA Specification Level 1, version 2.01,# af-phy-0017.000, (March, 1994) and The ATM Forum Technical Committee UTOPIA Specification Level 2, version 1.0, # af-phy-0039.000 (June, 1995).

High speed controllers 20 operate on the same network transmission frequency as master controller 12. For example, data that is sent by master controller 12 over a data link 28 at fifty megahertz (MHz) can be received by high-speed slave controllers 20 at fifty megahertz. Therefore, the frequency at which the data is transmitted does not need to be converted. The same is true for data sent by high-speed slave controllers 20 to master controller 12 over data link 26.

However, data transmitted by master controller 12 at fifty megahertz cannot be directly received by low-speed slave controllers 16 operating at twenty-five megahertz, for example. Likewise, data sent at twenty-five megahertz by low-speed slave controllers 16 cannot be directly received by master controller 20. In order for data to be transmitted between master slave controller 12, transmitting at a high frequency, and low-speed slave controllers 16, transmitting at a lower frequency, a frequency converter 14 is coupled between controllers 12 and 16. A state machine system 31 (FIG. 2), which in the illustrated embodiment includes frequency converter 14 includes four state machines 30, 32, 38 and 40. These state machines include a receive (RX) slave state machine 30, a transmit (TX) slave state machine 32, a receive (RX) master state machine 38, and a transmit (TX) master state machine 40. The state machines are described in more detail below in conjunction with FIGS. 2 through 8.

Frequency converter 14 is coupled to master controller 12 by data links 26 and 28. Data link 26 couples a receiver port 22 of master controller 12 to RX slave state machine 30. Data link 28 couples a transmission port 24 of master controller 12 to TX slave state machine 32. Frequency converter 14 is coupled to a low-speed slave controller 16 by data links 42 and 44. Data links 42, 44, 46, and 48 may carry the same number of bits as data links 26 and 28, for example sixteeen, or may carry a different number of bits. Other slave controllers 16 may be coupled to frequency converter 14; however, the connection of only one slave controller 16 with peripherals 18 will be described. Data link 42 couples a transmission port of low-speed slave controller 16 to RX master state machine 38. Data link 44 couples a reception port of low-speed slave controller 16 to TX master state machine 40.

The implementation of a frequency converter embodying the present invention allows the simultaneous use of high-speed and low-speed network elements in the same network. Traditionally, in some applications, the transmission frequency of the high-speed elements would have to be degraded to the transmission frequency of the slowest network element. However, through the use of a frequency converter incorporating the teachings of the present invention, the high-speed network elements are permitted to transmit data at a high frequency between one another, while all data transmissions directed towards the low-speed network elements are converted to the lower transmission frequency of those elements. Likewise, all data transmissions from the low-speed elements are converted to the frequency at which the high-speed elements are operating. Thus, all network elements are permitted to operate at their highest transmission frequency.

Figure 2:
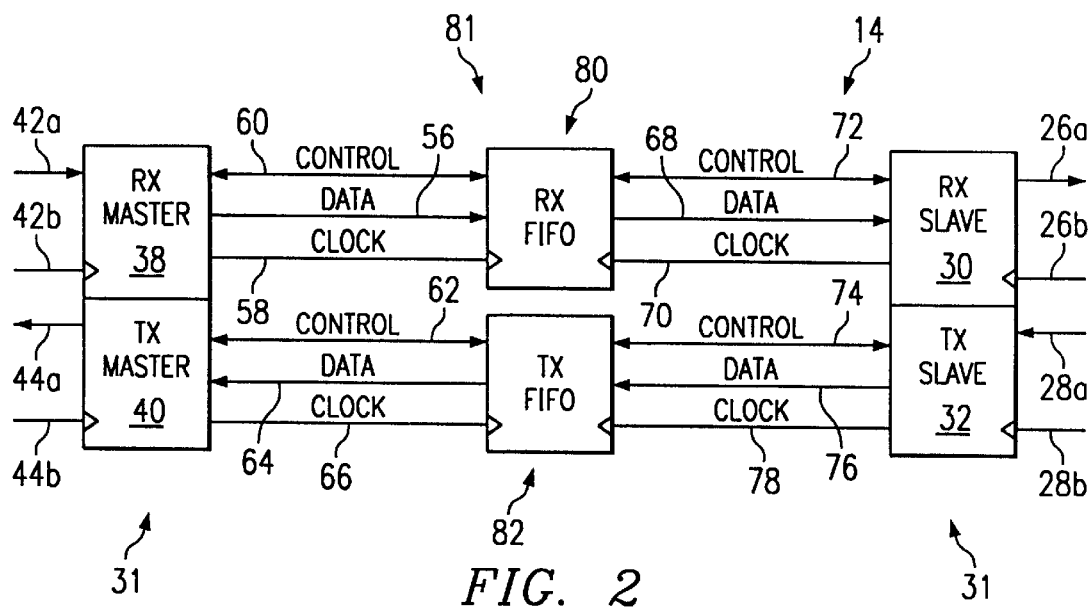
FIG. 2 is a block diagram telling additional details of the frequency converter of FIG. 1.

Referring now to FIG. 2, frequency converter 14 of FIG. 1 is shown in greater detail. Data that is transmitted from master controller 12 to low-speed slave controller 16 is converted through the operation of TX slave state machine 32; a transmit First In, First Out (FIFO) memory buffer 82 (hereinafter "TX FIFO 82"); and TX master state machine 40. Buffer 82 forms a part of a buffer system 81. Data is transmitted from master controller 12 to TX slave state machine 32 via data link 28a. In addition, clock signals 28b are also sent to TX slave state machine 32. It should be noted that master controller 12 is continuously sending clock signals 26b and 28b to RX slave state machine 30 and TX slave state machine 32, respectively. These clock signals are then sent to RX FIFO 80 and TX FIFO 82, respectively. An oscillator (not explicitly shown) continuously sends clock signals 42b and 44b to RX master state machine 38 and TX master state machine 40, respectively. These clock signals are then sent to RX FIFO 80 and TX FIFO 82, respectively.

Control signals 74 are sent between TX slave state machine 32 and TX FIFO 82 to control the transmission of data from master controller 12 to TX FIFO 82. Control signals 74 include queries made by TX slave state machine 32, and responses returned by TX FIFO 82. Control signals 74 are used to inform TX slave state machine 32 when to transmit data 76 to TX FIFO 82. Since data is being transmitted from master controller 12 at a higher frequency than slave controller 16 can receive it, the data stream must be slowed. TX FIFO 82 acts as a buffer between the high-frequency incoming data 76 and the low-frequency outgoing data 64. Incoming data 76 is written to the memory of TX FIFO 82 at high frequency by TX slave state machine 32. When appropriate, data 64 is retrieved from TX FIFO 82 by TX master state machine 40 at the lower frequency of slave controller 16. Control signals 62 are sent between TX master state machine 40 and TX FIFO 82, so that TX master state machine 40 will know when to retrieve data 64 from TX FIFO 82 for slave controller 16.

The entire process of sending data from master controller 12 to slave controller 16, as described above, is described in greater detail in conjunction with FIGS. 3, 4, 5A, 5B, and 6. The reverse process of sending data from slave controller 16 to master controller 12 is accomplished through the use of RX master state machine 38, RX FIFO 80, and RX slave state machine 30. RX FIFO 80 also is part of buffer system 81. These components operate in a similar fashion as TX slave state machine 32, TX FIFO 82, and TX master state machine 40, except that they operate to take a lower frequency transmission and convert it into a higher frequency transmission. Thus, RX FIFO 80 and TX FIFO 82 receive and transmit data at both the frequency of master controller 12 and the frequency of slave controller 16. The operation of these components is described in further detail in conjunction with FIGS. 7 and 8.

Figure 3:
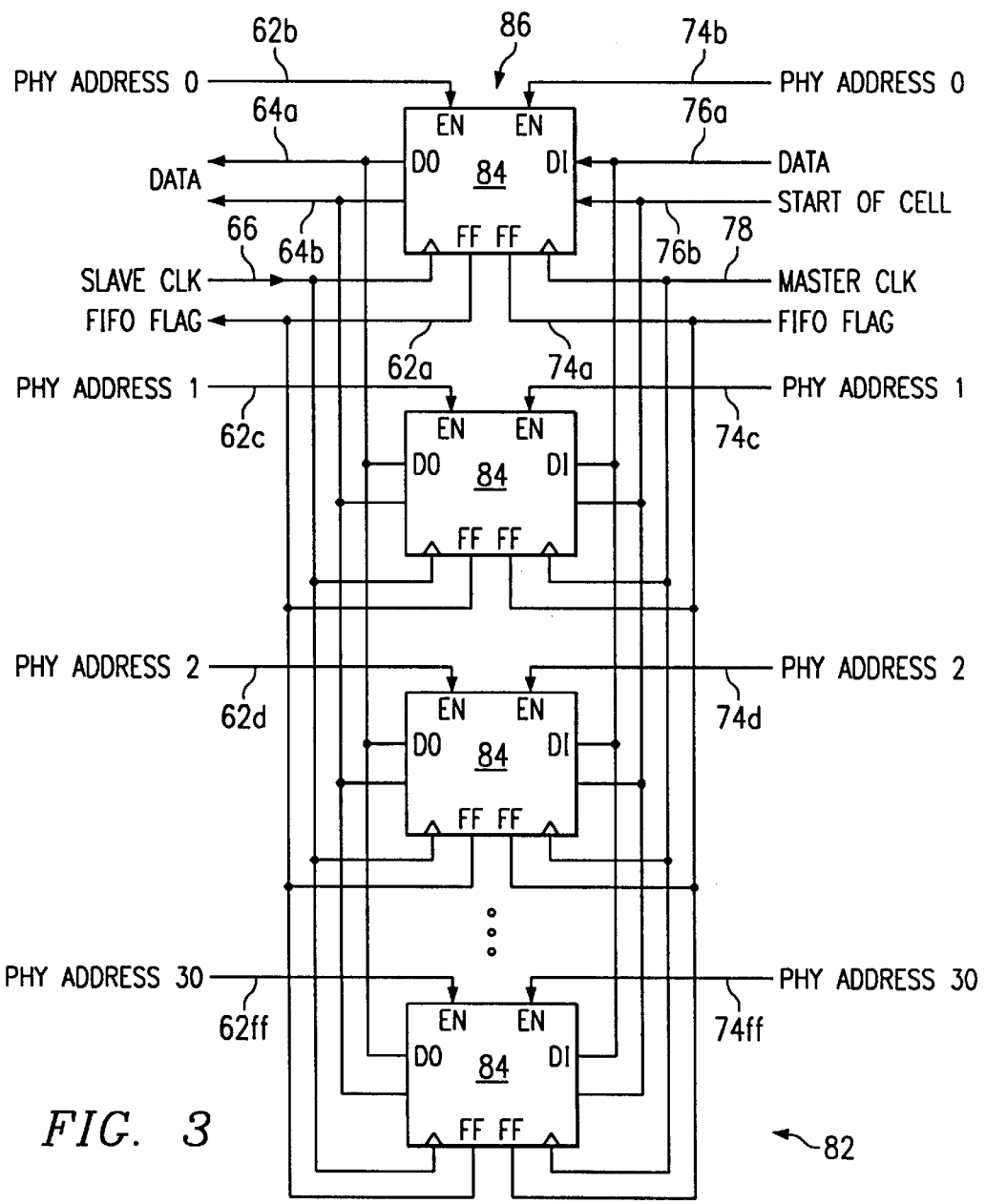
FIG. 3 is a block diagram illustrating a buffer of the frequency converter illustrated in FIG. 2.

Referring now to FIG. 3, TX FIFO 82 is shown in greater detail. It should be noted that RX FIFO 80 has a similar configuration, and thus will not be described at this level of detail. TX FIFO 82 includes up to thirty-one separate memory buffers 84. In the illustrated embodiment, each memory buffer 84 can store at least two ATM cells. Each memory buffer is associated with one of thirty-one possible peripherals (phys) 18 attached to slave controller 16. For example, the uppermost memory buffer 84 and its associated connections form a memory system 86 that is associated with a particular peripheral 18 denoted "phy 0".

Figure 4:
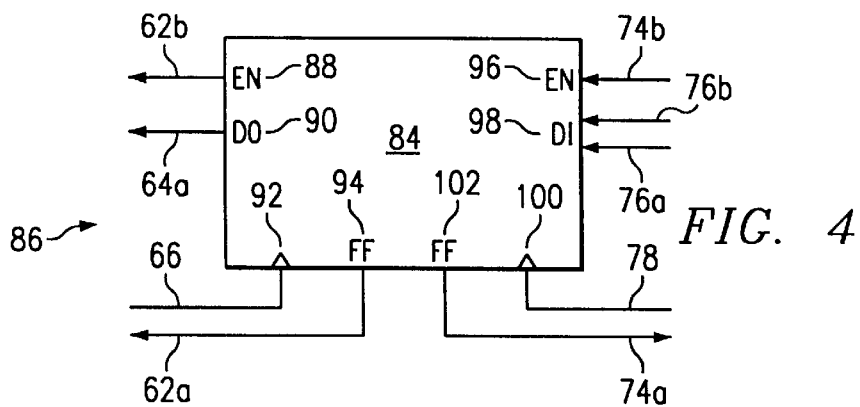
FIG. 4 is a block diagram showing additional details of the buffer of FIG. 3.

Referring now to FIGS. 3 and 4, address signal 74b, a type of control signal 74, is sent to TX FIFO 82 from TX slave state machine 32 informing TX FIFO 32 to which peripheral 18 of slave controller 16 certain data is directed. For example, if data is being directed to "phy 0," TX slave state machine 32 sends the enable signal for "phy 0" to the enable port 96 of memory buffer 84. The enable signal for the other memory buffers are not active. Enable signal 74b informs TX FIFO 82 that it will write the incoming data to memory buffer 84 associated with "phy 0." Similar enable signals 74c through 74ff are sent if data is being transmitted to other peripherals 18. This informs TX FIFO 82 that it should write the data to other memory buffers 84. For simplicity, further descriptions will assume that data is being sent to "phy 0" via memory system 86.

Referring still to FIGS. 3 and 4, when memory system 86 is ready to receive data for "phy 0", it informs TX slave state machine 32 of this fact with a FIFO flag 74a sent out via a FIFO flag port 102. FIFO flag 74a is another type of control signal 74. When memory buffer 84 is ready, TX slave state machine 32 transmits data body 76a and start of cell information 76b, which simply indicates the beginning of the data body 76a. This data is received by memory buffer 84 over data input port 98. The data is then stored in memory buffer 84 until TX master state machine 40 is ready to retrieve it for transmission to slave controller 16.

TX FIFO 82 informs TX master state machine 40 that it has data for "phy 0" by sending a FIFO flag 62a via FIFO flag port 94. Once slave controller 16 informs TX master state machine 40 that it is ready for a data transfer, TX master state machine 40 obtains data 64a and start of cell 64b from memory buffer 84 via data out port 90. The data is received at the operating frequency of slave controller 16. Enable signal 62b, representing the address of "phy 0", is also sent for routing purposes via enable port 88. TX master state machine 40 sends this data to slave controller 16 for distribution to "phy 0". As mentioned above, RX FIFO 80 is configured and operates in a similar manner as TX FIFO 82, described above.

Figure 5A:
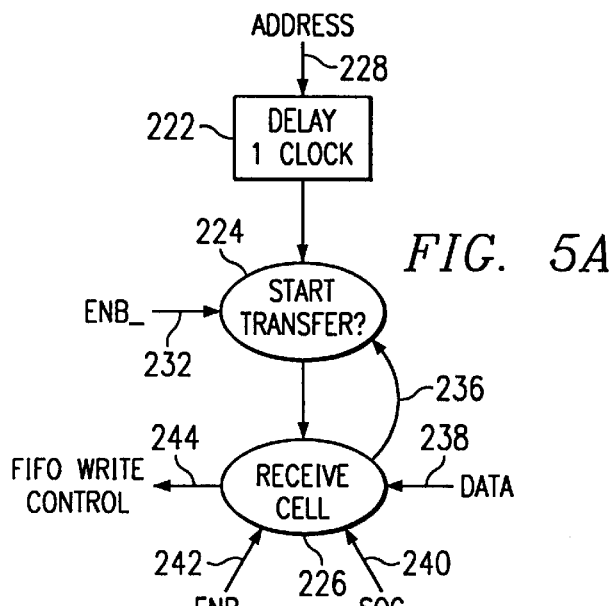
FIGS. 5A and 5B are state diagrams showing operation of a transmission slave unit of the frequency converter illustrated in FIG. 2.
Figure 5B:
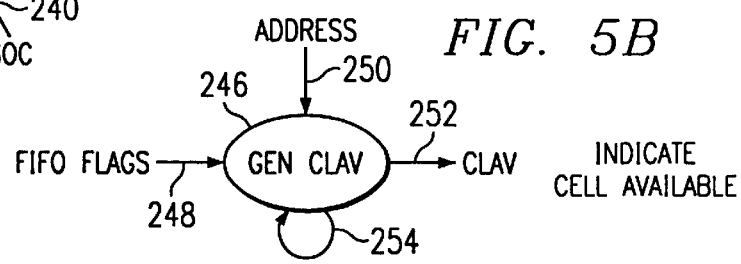

FIGS. 5A and 5B are state diagrams showing the operation of TX slave state machine 32. TX slave state machine 32 is responsible for transferring information from master controller 12 to TX FIFO 82 at the frequency of high speed controller 12. Referring now to FIG. 5A, TX slave state machine 32 initially receives an address signal 228 from master controller 12, indicating a device (peripheral) to which certain cells of data is to be sent. TX slave state machine 32 then delays address signal 228 one clock cycle at a state 222 to align address signal 228 with an enable signal 232. TX slave state machine 32 then monitors enable signal 232 at a state 224. If enable signal 232 is low, then TX slave state machine 32 is instructed that the transfer of data from master controller 12 is to begin. In response, TX slave state machine 32 proceeds to a state 226. At state 226, the transfer of a data cell begins. The data is transferred from master controller 12 to TX FIFO 82 by TX slave state machine 32. The data is transferred to the particular memory buffer 84 associated with the device address signal 228 using the FIFO write control 244. The transferred data includes a data body 238 and a start of cell 240. After the data has been transferred at state 226, TX slave state machine 32 returns to state 224 to await additional available cells, as indicated by arrow 236. Whether cells are available is indicated by enable signal 232.

Referring now to FIG. 5B, TX slave state machine 32 is also responsible for sending a CLAV (cell available) signal 252 back to master controller 12. At a state 246, when TX slave state machine 32 receives a device's address 250 from master controller 12, it generates CLAV signal 252 based on the FIFO flags 248. If the FIFO flag 248 for that particular device indicates that there is space in the associated memory buffer 84 for a full cell, then TX slave state machine 32 sets CLAV signal 252 to "1" to indicate that such space is available. If space is not available, CLAV signal 252 is set to "0". The enable signal will not go active until the CLAV signal 252 equals "1".

Thus, regardless of the speed at which state controller 16 may receive data, master controller 12 may transfer data to a buffer (TX FIFO 80) at a high frequency specified by clock signal 28b from master controller 12. This data may then be gathered and transmitted to slave controller 16 at an appropriate frequency as described below.

Figure 6:
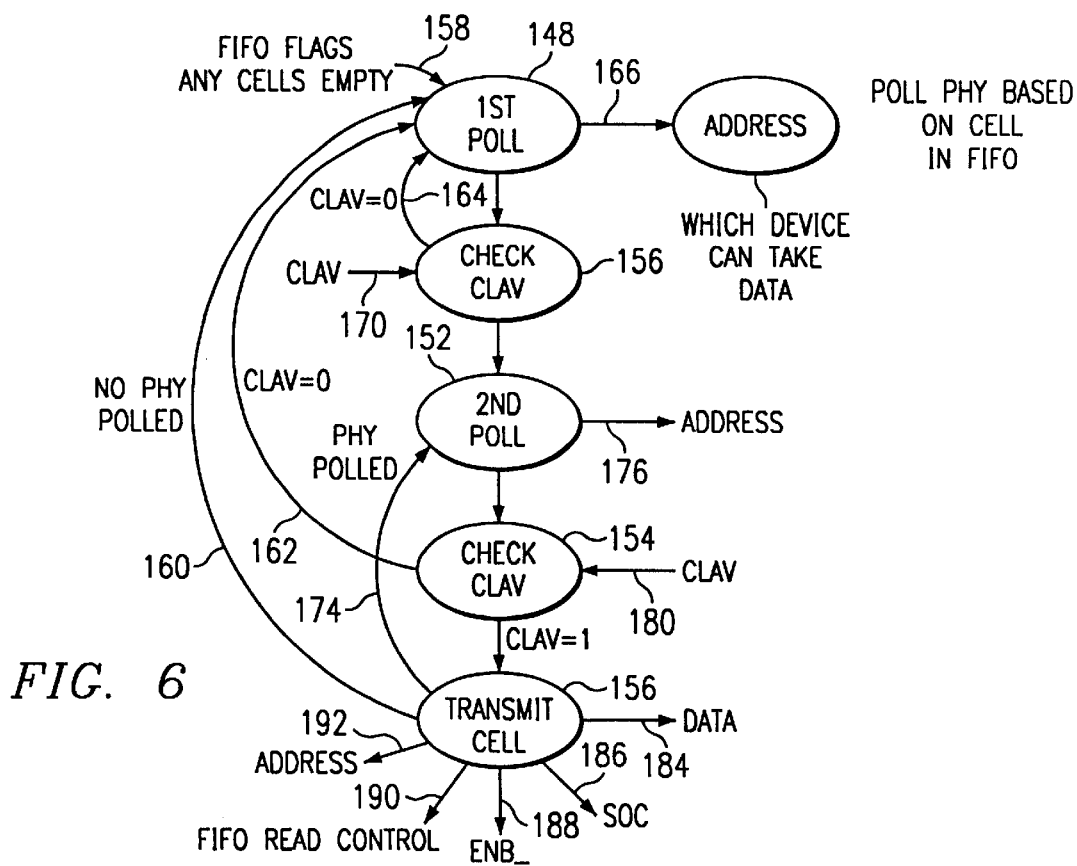
FIG. 6 is a state diagram showing the operation of a transmission master unit of the frequency converter of FIG. 2.

Once data has been transferred to TX FIFO 82 from high speed controller 12 at a high frequency by TX slave state machine 32, the data is then available to be transferred to slave controller 16 by TX master state machine 40 at a lower frequency. Referring now to FIG. 6, a state diagram is provided showing the operation of TX master state machine 40. At a state 148, TX master state machine 40 polls the FIFO flag 158 of each memory buffer to determine if any of the buffers have cells to transfer. TX master state machine 40 is able determine to which device the cells are to be transferred since it can determine from which memory buffer the FIFO flag originated, since each memory buffer is associated with a particular device. If TX master state machine 40 determines that a buffer has cells to transmit, it transmits the associated device's address 166 to slave controller 16.

TX master then waits for a CLAV response 170 returned by slave controller 16 at a state 156. CLAV response 170 indicates whether slave controller 16 has space for a cell. A response of "0" means no space, while a response of "1" means there is space available. If CLAV response 170 is "0", TX master state machine 40 returns to state 148 to poll FIFO flags 158, as indicated by arrow 164. If CLAV response 170 is "1", TX master state machine 40 then proceeds to a state 152 at which it again transmits the device's address 176 to check again if space is available. TX master state machine 40 then checks a CLAV response 180 to this transmission at a state 154. If CLAV response 180 is "0", TX master state machine 40 returns to state 148, as indicated by arrow 162. If CLAV response 180 is "1", TX master state machine 40 proceeds to state 156.

At state 156, TX master state machine 40 transfers data 184 from memory buffer 84, using FIFO read control 190, to slave controller 16 for delivery to the appropriate device. TX master state machine 40 also transmits the start of cell 186 and device address information 192. The transfer is controlled by an enable signal 188. During state 156, TX master state machine 40 continues to poll FIFO flags and checks a returning CLAV from the polls. When TX master state machine 40 has transferred the cell, it returns to state 152 if a CLAV has has a value of "1" during the cell transfer, as indicated by arrow 174. TX master state machine 40 then either transmits more cells, if appropriate, at state 156, or it returns to state 148, as shown by arrow 160.

Thus, regardless of the frequency at which master controller 12 transmits information, data may be received from TX FIFO 82 by slave controller 16 at a lower frequency associated with slave controller 16 and designated by clock signal 44b. Conversion of data at a lower frequency to a higher frequency is described in conjunction with FIGS. 7 and 8.

Figure 7:
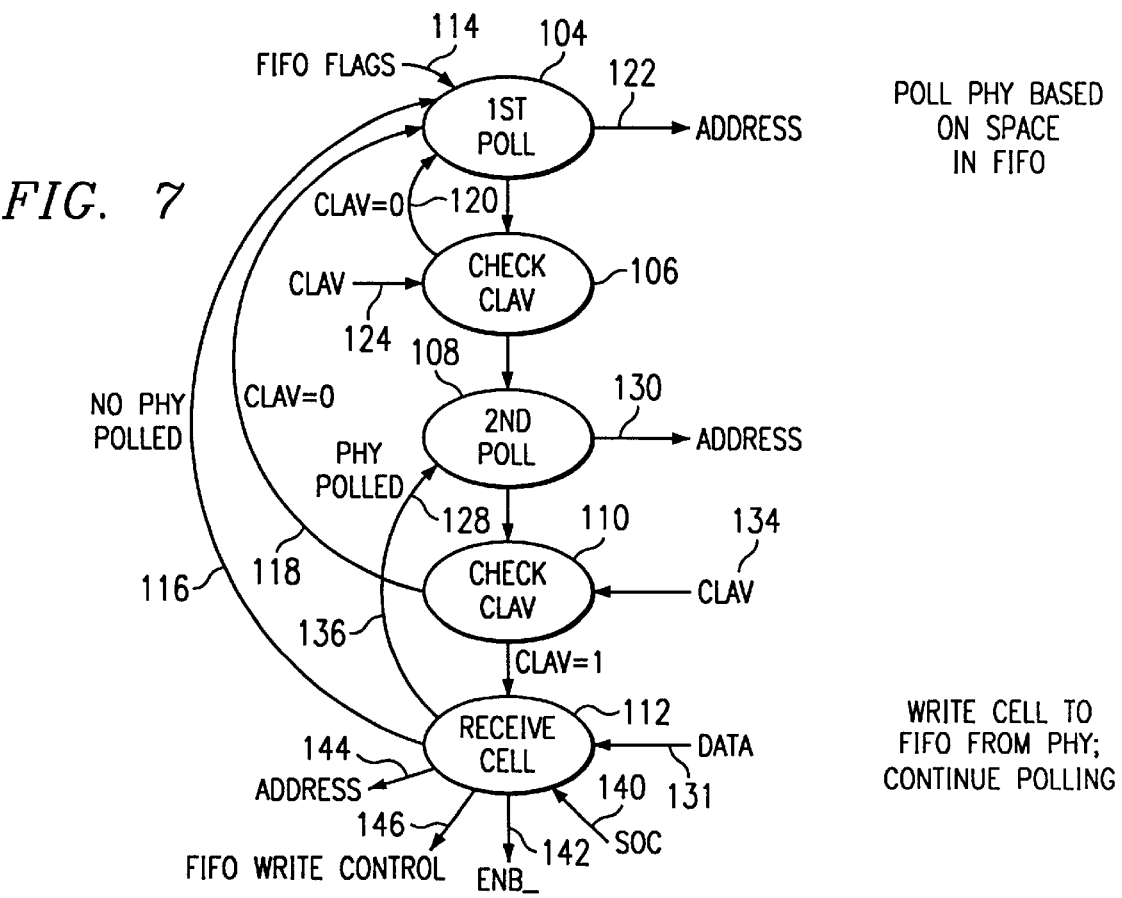
FIG. 7 is a state diagram showing the operation of a receive master unit of the frequency converter of FIG. 2.

FIG. 7 is a state diagram showing the operation of RX master state machine 38. RX master state machine 38 is responsible for transferring, at a lower frequency, information from slave controller 16 to RX FIFO 80. The operation of RX master 40 is similar to that of TX master, shown in FIG. 6, except that data is received rather than transmitted to slave controller 16. At a state 104, RX master state machine 38 polls the FIFO flag 158 of each memory buffer 84 to determine if any of the buffers 84 have memory space available. RX master state machine 38 then sends the address 122 of any device whose associated memory buffer 84 has available space to slave controller 16.

TX master then proceeds to a state 106 and waits for a CLAV response 124 returned by slave controller 16. CLAV response 124 indicates whether slave controller 16 has cells that need to be transferred to the memory buffer 84 associated with the indicated device. A response of "0" means there are no cells available, while a response of "1" means there are cells available. If CLAV response 124 is "0", RX master state machine 38 returns to state 104 to continue to poll FIFO flags 158, as indicated by arrow 120. If CLAV response 124 is "1", RX master state machine 38 then proceeds to a state 108 at which it again transmits the device's address 130 to check again if any cells are waiting on slave controller 16 associated with that device. RX master state machine 38 then checks a CLAV response 134 to this transmission at a state 110. If CLAV response 134 is "0", RX master state machine 38 returns to state 104, as indicated by arrow 118. If CLAV response 134 is "1", RX master state machine 38 proceeds to a state 112.

At state 112, RX master state machine 38 receives data 131 from slave controller 16 and transfers it to memory buffer 84 associated with the particular device, using FIFO write control 146. RX master state machine 38 also receives the start of cell information 140 and device address signal 144 to transmit to memory buffer 84. The reception of the data cell is controlled by an enable signal 142. During state 112, RX master state machine 38 continues to poll FIFO flags and checks a returning CLAV from the polls. When RX master state machine 38 has received the cell and transferred it to memory buffer 84, it returns to state 108 if a CLAV was "1" during the cell transfer, as indicated by arrow 136. RX master state machine 38 then either receives more cells, if appropriate, at state 112, or it returns to state 104, as shown by arrow 118.

Thus, regardless of the frequency at which master controller 12 receives information, data may be transferred to RX FIFO 80 by slave controller 16 at a lower frequency associated with slave controller 16. This lower frequency is designated by clock signal 42b. Once RX master state machine 38 has transferred data from slave controller 16 to RX FIFO 80, the data is available to be transferred to master controller 12 by RX slave state machine 30.

Figure 8:
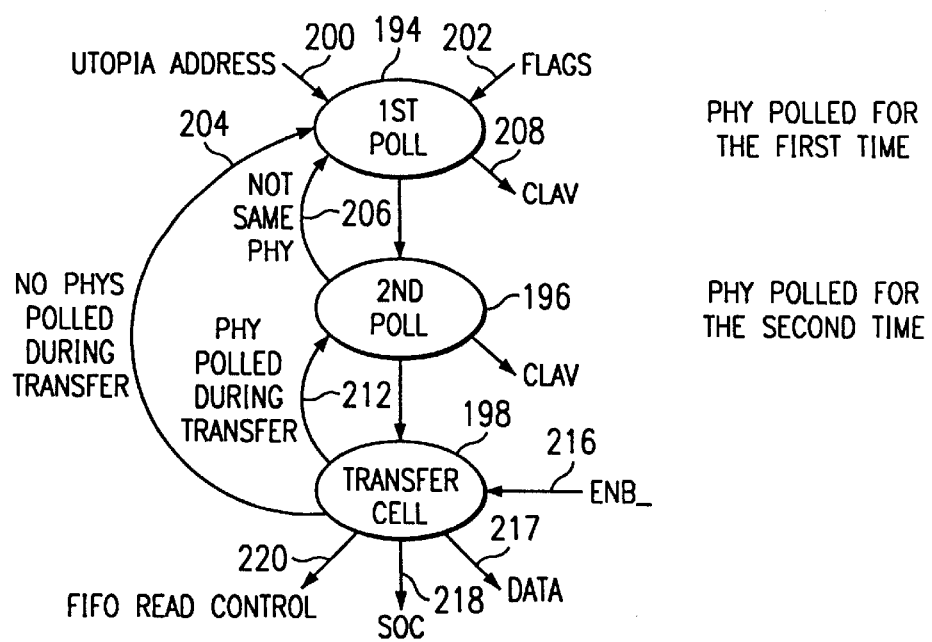
FIG. 8 is a state diagram showing operation of a receive slave unit of the frequency converter of FIG. 2.

FIG. 8 is a state diagram showing the operation of RX slave state machine 30. RX slave state machine 30 first receives a device address signal 200 from master controller 12. At a state 194, RX slave state machine 30 then polls the FIFO flags 202 transmitted by RX FIFO 80 to see if the memory buffer 84 associated with that device has cells available. RX slave state machine 30 then transmits a CLAV response 208 when polled by master controller 12 indicating whether there are cells available for transmission in that particular memory buffer 84. RX slave state machine 30 again polls the FIFO flags 202 at a state 196 when polled by master controller 12 and transmits a CLAV response 208. If RX slave state machine 30 is polled with a different address, then it returns to state 194, as indicated by arrow 206. But if RX slave state machine 30 is polled with the same address, then it proceeds to a state 198. This indicates the master controller 12 is granting the data bus to the device specified by the address to transfer a cell.

At state 198, RX slave state machine 30 transfers the available cells to master controller 12 using FIFO read control 220. The transfer is controlled by an enable signal 216 from master controller 12. The transferred data includes data body 217 and start of cell 218. As RX slave state machine 30 is transferring the data, master utopia controller 12 continues to poll RX FIFO 80 to determine if any more cells associated with that device are available. If cells are available for that device, state machine 30 proceeds to state 196, as indicated by arrow 212. RX slave state machine 30 returns to state 194, as indicated by arrow 204.

Thus, regardless of the frequency at which slave controller 16 transmits data, master controller 12 may receive data at its higher frequency from RX FIFO 80. The rate at which data is received is specified by clock signal 26b received from master controller 12.

Although the present invention and its advantages have been described in detail, it should be understood that various changes, substitutions, and alterations can be made therein without departing from the spirit and scope of the present invention as defined by the appended claims. For example, although the embodiment illustrated in FIG. 1 explicitely recites a master controller operating at a frequency greater than some peripheral devices in the network, the teachings of the present invention and the associated frequency conversion also apply in the context of a master controller operating at a frequency less than the frequency of some of the peripheral devices.

What is claimed is:

1. A method for communicating information comprising:

providing a frequency conversion system between a controller associated with a low speed device and a high speed controller, the frequency conversion system comprising a buffer system operable to store data and a state machine system operable to control movement of data into and out of the buffer system;

receiving at the state machine system in the frequency conversion system a high speed clock signal from the high speed controller;

transmitting, by the state machine system in the frequency conversion system, a first cell available signal to the high speed controller, the first cell available signal indicating the buffer system in the frequency conversion system is available to receive data;

in response to transmission of the first cell available signal to the high speed controller, transmitting data from the high speed controller to the buffer system at a first frequency corresponding to the high speed clock signal, the data transmission aligned by the high speed clock signal;

polling according to UTOPIA protocol, by the state machine system, the buffer system in the frequency converter to determine if it has data to be transferred and determining that it has data to be transferred;

receiving at the state machine system in the frequency conversion system a low speed clock signal, the low speed clock signal having a frequency lower than the high speed clock signal;

in response to determining that the buffer system in the frequency conversion system has data to be transferred, transmitting, by the state machine system, the address of the low speed device to the controller associated with the low speed device;

receiving, at the state machine system, a second cell available signal from the controller associated with the low speed device indicating the low speed device is ready to receive data; and transmitting the data in the buffer system, by the second state machine, at a second frequency corresponding to the frequency of the low speed clock signal to the low speed device, the data transmission to the low speed device aligned with the low speed clock signal.

2. The method of claim 1, and further comprising, before transmitting, by the state machine system, the cell available signal to the high speed controller, receiving at the first state machine a flag indicating the buffer is available for receiving data.

3. The method of claim 1, wherein transmitting, at a first frequency, data from the high speed controller comprises transmitting an ATM cell at the first frequency.

4. The method of claim 1, and further comprising polling according to UTOPLIA protocol, by the state machine system, a plurality of buffers associated with a respective low speed device to determine if each one of the plurality of buffers has data to be transferred.

5. The method of claim 1, and further comprising transmitting again, by the state machine system, the address of the low speed device to the controller associated with the low speed device after receiving the second cell available signal indicating the low speed device is ready to receive the data and receiving an additional second cell available signal in response.

6. The method of claim 1, wherein the high speed controller transmits and receives data at 50 MHz and the first frequency is 50 MHz.

7. The method of claim 1, wherein the low speed device transmits and receives data at 25 MHz and the second frequency is 25 MHz.

8. The method of claim 1, wherein the high speed controller is formed integral with the high speed device.

9. The method of claim 1, wherein the controller associated with the low speed device is formed integral with the low speed device.

10. A method for communicating information comprising:

providing a frequency conversion system between a controller associated with a low speed device and a high speed controller, the frequency conversion system comprising a buffer system operable to store data and a state machine system operable to control movement of data into and out of the buffer system;

receiving at the state machine system in the frequency conversion system a high speed clock signal from the high speed controller;

polling according to UTOPIA protocol, by the state machine system, the buffer system to locate a buffer associated with the low speed device that has memory space available;

transmitting, by the state machine system, the address of the low speed device associated with the buffer having memory space available to a controller associated with the low speed device;

receiving, by the state machine system in the frequency conversion system, a first cell available signal from the controller associated with the low speed device, the first cell available signal indicating data are available for transfer from the low speed device to the buffer associated with the low speed device;

in response to receiving the first cell available signal, transmitting data from the low speed controller to the buffer associated with the low speed device at a first frequency corresponding to the high speed clock signal, the data reception aligned by the high speed clock signal;

receiving at the state machine system in the frequency conversion system a low speed clock signal, the low speed clock signal having a frequency lower than the high speed clock signal;

receiving at the state machine system from the high speed controller the address of the low speed device;

transmitting, by the second state machine, a cell available signal indicating the buffer associated with the low speed device has data for transfer to the high speed device; and transmitting, by the second state machine, at a second frequency higher than the first frequency, the data from the buffer associated with the low speed device to the high speed device, the data transmission to the high speed device aligned with the high speed clock signal.

11. The method of claim 10, wherein transmitting data from the low speed device comprises transmitting an ATM cell.

12. The method of claim 10, wherein the high speed controller transmits and receives data at 50 MHz and the second frequency is 50 MHz.

13. The method of claim 10, wherein the controller associated with the low speed device transmits and receives data at 25 MHz and the first frequency is 25 MHz.

14. The method of claim 10, wherein the high speed controller is formed integral with the high speed device.

15. The method of claim 10, wherein the controller associated with the low speed device is formed integral with the low speed device.

16. A method for communicating information according to UTOPIA protocol comprising:

providing a low speed UTOPIA slave controller and an associated low speed device;

providing a high speed UTOPIA master controller;

disposing a frequency conversion system between the low speed UTOPIA slave controller and the high speed UTOPIA master controller, the frequency conversion system comprising a buffer system operable to store data and an associated state machine system operable to control movement of data into and out of the buffer system;

transmitting data from the high speed UTOPIA master controller to the buffer system at a high speed frequency and according to UTOPIA protocol, the transmitted data to the buffer system aligned with a high speed clock signal received from the high speed controller; and transmitting data from the buffer system to the low speed UTOPIA device and according to UTOPIA protocol, through the low speed UTOPIA slave controller, at a low speed frequency, the low speed frequency having a frequency lower than the high speed frequency, the transmitted data from the buffer system aligned with a low speed clock signal having the low speed frequency.

17. A method for communicating information according to UTOPIA protocol comprising:

providing a high speed UTOPIA slave controller and an associated high speed device;

providing a low speed UTOPIA slave controller and an associated low speed device;

providing a high speed UTOPIA master controller, the high speed UTOPIA master controller operable to control the high speed UTOPIA slave controller;

disposing a frequency conversion system between the low speed UTOPIA slave controller and the high speed UTOPIA master controller, the frequency conversion system comprising a buffer system operable to store data and an associated state machine system operable to control movement of data into and out of the buffer system;

transmitting data from the high speed UTOPIA master controller to the buffer system at a high speed frequency and according to UTOPIA protocol, the transmitted data to the buffer system aligned with a high speed clock signal received from the high speed controller;

transmitting data from the buffer system to the low speed UTOPIA device and according to UTOPIA protocol, through the low speed UTOPIA slave controller, at a low speed frequency, the low speed frequency having a frequency lower than the high speed frequency, the transmitted data from the buffer system aligned with a low speed clock signal having the low speed frequency; and transmitting data from the high speed UTOPIA master controller to the high speed device and according to UTOPIA protocol at the high speed frequency.

* * * * *